US010375721B2

(12) United States Patent
Östergaard et al.

(10) Patent No.: US 10,375,721 B2
(45) Date of Patent: *Aug. 6, 2019

(54) METHOD AND APPARATUS IN A WIRELESS COMMUNICATIONS SYSTEM

(71) Applicant: Telefonaktiebolaget LM Ericsson (publ), Stockholm (SE)

(72) Inventors: Jessica Östergaard, Stockholm (SE); Magnus Stattin, Upplands Väsby (SE); Ghyslain Pelletier, Laval (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/834,952

(22) Filed: Dec. 7, 2017

(65) Prior Publication Data

US 2018/0098344 A1    Apr. 5, 2018

Related U.S. Application Data

(63) Continuation of application No. 15/044,654, filed on Feb. 16, 2016, now Pat. No. 9,844,071, which is a
(Continued)

(30) Foreign Application Priority Data

Jan. 25, 2010   (WO) ............... PCT/SE2010/050063

(51) Int. Cl.
*H04W 4/00* (2018.01)
*H04W 72/12* (2009.01)
*H04B 7/212* (2006.01)

(52) U.S. Cl.
CPC .............................. *H04W 72/1284* (2013.01)

(58) Field of Classification Search
None
See application file for complete search history.

(56) References Cited

U.S. PATENT DOCUMENTS 8,913,565 B2 *  12/2014   Ostergaard ........ H04W 72/1284
                                                       370/329
9,307,553 B2    4/2016   Östergaard et al.
(Continued)

FOREIGN PATENT DOCUMENTS

EP   2166810 A2    3/2010
JP   2010530707 A  9/2010
(Continued)

OTHER PUBLICATIONS

Ericsson. "Scheduling request triggering criterions for LTE." 3GPP TSG-RAN WG2 #59, Tdoc R2-073209, Athens, Greece, Aug. 20-24, 2007, pp. 1-4.
(Continued)

*Primary Examiner* — Ayaz R Sheikh
*Assistant Examiner* — Sori A Aga
(74) *Attorney, Agent, or Firm* — Coats & Bennett, PLLC

(57) ABSTRACT

A method in a user equipment for requesting that a base station schedule the user equipment for an uplink data transmission to the base station is provided. The user equipment comprises a buffer. Directly or indirectly responsive to receiving data into the buffer to be transmitted to the base station, the user equipment generates a scheduling request trigger. The scheduling request trigger is configured to trigger the sending of a scheduling request to the base station if the trigger is pending at the next scheduling request opportunity, and to remain pending until it is cancelled. The user equipment cancels the pending scheduling request trigger when the data is accounted for in a buffer status report, which reports the size of the buffer to the base station,
(Continued)

or when the data is included directly in a scheduled uplink data transmission whichever occurs first.

8 Claims, 9 Drawing Sheets

Related U.S. Application Data continuation of application No. 14/537,202, filed on Nov. 10, 2014, now Pat. No. 9,307,553, which is a continuation of application No. 12/717,176, filed on Mar. 4, 2010, now Pat. No. 8,913,565.

(60) Provisional application No. 61/175,668, filed on May 5, 2009.

(56) References Cited

U.S. PATENT DOCUMENTS

| | | | |
|---|---|---|---|
| 2007/0133458 | A1 | 6/2007 | Chandra et al. |
| 2009/0113086 | A1 | 4/2009 | Wu et al. |
| 2009/0201868 | A1 | 8/2009 | Chun et al. |
| 2009/0290570 | A1 | 11/2009 | Kishiyama et al. |
| 2010/0040028 | A1* | 2/2010 | Maheshwari ......... H04W 74/02 370/336 |
| 2010/0077100 | A1 | 3/2010 | Hsu et al. |
| 2010/0232385 | A1 | 9/2010 | Hsu |
| 2012/0008548 | A1 | 1/2012 | Suga |

FOREIGN PATENT DOCUMENTS

| | | | |
|---|---|---|---|
| KR | 1020090034527 A | | 4/2009 |
| RU | 2305372 C2 | | 8/2007 |
| RU | 2341029 C2 | | 12/2008 |
| WO | 2005096558 A1 | | 10/2005 |
| WO | 2006037492 A1 | | 4/2006 |
| WO | 2007148586 A1 | | 12/2007 |
| WO | 2008050425 A1 | | 5/2008 |
| WO | 2008156198 A2 | | 12/2008 |
| WO | 2008156402 A1 | | 12/2008 |

OTHER PUBLICATIONS

Ericsson, et al. "Framework for Scheduling Request and Buffer Status Reporting." TSG-RAN WG2 Meeting #60, Tdoc R2-074691, Jeju, Korea, Nov. 5-9, 2007, pp. 1-4.

Sunplus mMOBILE Inc. "Consideration on BSR triggers." TSG-RAN WG2 Meeting #60bis, R2-080400, Sevilla, Spain, Jan. 14-18, 2008, pp. 1-5.

Nokia Siemens Networks, et al. "Usage of RRC Parameters." Change Request, 3GPP TSG-RAN2 Meeting #65, R2-091651, Athens, Greece, Feb. 9-13, 2009, pp. 1-17.

3rd Generation Partnership Project. "3rd Generation Partnership Project; Technical Specification Group Radio Access Network; Evolved Universal Terrestrial Radio Access (E-UTRA); Packet Data Convergence Protocol (PDCP) specification (Release 8)." 3GPP TS 36.323, V8.5.0, Mar. 2009, Sophia Antipolis Valbonne, France, pp. 1-24.

3rd Generation Partnership Project. "3rd Generation Partnership Project; Technical Specification Group Radio Access Network; Evolved Universal Terrestrial Radio Access (E-UTRA) Radio Link Control (RLC) protocol specification (Release 8)." 3GPP TS 36.322, V8.5.0, Mar. 2009, Sophia Antipolis Valbonne, France, pp. 1-39.

3rd Generation Partnership Project. "3rd Generation Partnership Project; Technical Specification Group Radio Access Network; Evolved Universal Terrestrial Radio Access (E-UTRA) Medium Access Control (MAC) protocol specification (Release 8)." 3GPP TS 36.321, V8.5.0, Mar. 2009, Sophia Antipolis Valbonne, France, pp. 1-46.

* cited by examiner

METHOD AND APPARATUS IN A WIRELESS COMMUNICATIONS SYSTEM

RELATED APPLICATIONS

This application is a continuation of U.S. patent application Ser. No. 15/044,654 filed Feb. 16, 2016, now U.S. Pat. No. 9,844,071, which is a continuation of Ser. No. 14/537,202 filed Nov. 10, 2014, now U.S. Pat. No. 9,307,533, which is a continuation of U.S. patent application Ser. No. 12/717,176 filed 4 Mar. 2010, now U.S. Pat. No. 8,913,565, which claimed priority under 35 U.S.C. § 119(e) from U.S. Provisional Application No. 61/175,668, filed on 5 May 2009, also claimed priority under 35 U.S.C. § 365(c) from International Application No. PCT/SE2010/050063, filed on 25 Jan. 2010. The disclosures of each of these applications are incorporated herein by reference in their entirety.

TECHNICAL FIELD

The present disclosure relates to a method and an apparatus in a user equipment. In particular, it relates to handling scheduling request triggers.

BACKGROUND

In a typical cellular radio system, also referred to as a wireless communication system, User Equipments (UEs) communicate via a Radio Access Network (RAN) to one or more core networks. The user equipments may also be known as mobile terminals and/or wireless terminals. In particular, the user equipments may be mobile stations or user equipment units, such as mobile telephones (e.g., "cellular" telephones), and laptops with wireless capability (e.g., mobile termination). User equipments may therefore be portable, pocket, hand-held, computer-included, or car-mounted mobile devices which communicate voice and/or data with the radio access network.

The radio access network covers a geographical area which is divided into cell areas, with each cell area being served by a base station, e.g., a Radio Base Station (RBS), which in some networks is also called "eNB", "NodeB" or "B node" and which in this document is referred to as a base station. A cell is a geographical area where radio coverage is provided by the radio base station equipment at a base station site. The base stations communicate over the air interface, operating on radio frequencies, with user equipment units that are within range of the base stations.

In wireless communication systems, the radio UpLink (UL) is the transmission path from the user equipment to a base station and the radio DownLink (DL) is the transmission path from a base station to the user equipment. In Release 8, of the 3GPP Long Term Evolution (LTE) standard, the arrival of new UL data of higher priority than the already existing data, or of any priority when there is no previous data, to the UE buffer triggers a so-called Regular Buffer Status Report (BSR). There are, of course, side conditions to this. For example, new UL data only triggers a BSR if it is data for a logical channel belonging to a Logical Channel Group (LCG). Further, the "arrival of new UL data" is defined as when UL data becomes available for transmission in a Radio Link Controller (RLC) entity, or in the Packet Data Convergence Protocol (PDCP) entity. The PDCP is an upper layer of the RLC entity However, notwithstanding these side conditions, the arrival of new UL data generally triggers a regular BSR. The regular BSR, in turn, triggers the generation of a Scheduling Request (SR) trigger. The SR trigger then triggers an SR to be conveyed to the base station, thereby informing the base station that the user equipment has new data that it would like to transmit. The SR is transmitted to the base station either on (1) the user equipment's preallocated scheduling request resource on a Physical Uplink Control Channel (PUCCH), in which case the SR is known as dedicated SR (D-SR) since it is transmitted on a resource dedicated to the user equipment, or (2) on the Physical Random Access Channel (PRACH), in which case the SR is known as a random access SR (RA-SR). In both cases, there is a fixed periodicity associated with the opportunities to transmit an SR. This means that, in order to transmit an SR, the user equipment has to wait until such an opportunity is available.

When the base station receives a D-SR, the base station typically issues an UL grant. When the user equipment transmits on that grant, it will transmit a MAC Packet Data Unit (PDU) that includes a BSR in the shape of a so-called BSR Medium Access Control (MAC) control element, describing the size of its buffers. The BSR is mandated to reflect the buffer status after the MAC PDU, including the BSR MAC control element, is built. A BSR is always included if a BSR trigger is pending in the user equipment at the time of building the MAC PDU, unless all data can fit in the MAC PDU but there is not room enough for a BSR in addition to the data.

Once the size of the user equipment buffer has been reported to the base station, there is no need for the user equipment to send additional SRs as the base station now knows how much data the user equipment has to transmit. The SR trigger can hence be cancelled in the user equipment, so that the user equipment will not send any D-SR at the next D-SR opportunity.

Please note that in the description below, the following terminology will be used:

The term "arrival of new data" is used to indicate arrival of new UL data in the user equipment buffer, with all side conditions for triggering a Regular BSR satisfied.

The term "reception of grant" is used to indicate the reception of a Physical Downlink Control Channel (PDCCH) grant for Uplink Shared Channel (UL-SCH) resources for a new transmission.

The term "transmission of data" is used to indicate transmission of UL data on UL-SCH resources that have been made available for a new transmission.

The term "SR" and "scheduling request" is used to indicate signalling of D-SR on the PUCCH.

The term "SR trigger" and "scheduling request trigger" is used to indicate a pending SR.

When expressions such as "buffer status report accounts for first data" are used, it means that the buffer status report reflects whatever is left of the first data after the transmission in which the buffer status report is included has been received.

An SR is considered pending until cancelled, i.e. an SR trigger that triggers the transmission of an SR, is considered pending until cancelled. It was first agree upon, in a prior version of the LTE standard, that an SR would be cancelled in the first possible Transmission Time Interval (TTI), also known as subframe, when UL-SCH resources for a new transmission are granted. However, some argued that it was unclear exactly when UL-SCH resources for a new transmission are granted, whether it be when a PDCCH grant is received or in the TTI when the UL-SCH resources are actually available. It was subsequently agreed upon that all pending SRs should be cancelled in the TTI when UL-SCH resources are actually available for a new transmission.

SUMMARY

Embodiments of the present disclosure improve the performance of a wireless communications network.

One embodiment, for example, comprises a method in a user equipment for requesting that a base station schedule the user equipment for an uplink data transmission to the base station. The user equipment comprises a buffer. The method includes receiving data into the buffer that is to be transmitted to the base station via a scheduled uplink data transmission. The method then includes sending a scheduling request to the base station when a next scheduling request opportunity occurs, if and only if the buffer comprises data that has neither been accounted for in a buffer status report, which reports the size of the buffer to the base station, or included directly in a scheduled uplink data transmission In another embodiment, the user equipment generates a scheduling request trigger after receiving data into the buffer to be transmitted to the base station. The scheduling request trigger is triggered directly or indirectly by the arrived data; that is, the user equipment generates the scheduling request trigger directly, or indirectly, responsive to the arrival of such data. The scheduling request trigger is configured to trigger the sending of a scheduling request to the base station if the trigger is pending at the next scheduling request opportunity. Once generated, the scheduling request trigger remains pending until it is cancelled by the user equipment. The user equipment cancels the pending scheduling request trigger when the data is accounted for in a buffer status report, or when that data is included directly in a scheduled uplink data transmission, whichever occurs first.

According to yet another embodiment, the user equipment tracks what data in the buffer has been accounted for in a buffer status report and what data in the buffer has been included directly in a scheduled uplink data transmission. The user equipment also tracks what data has not been accounted for in a buffer status report or included directly in a scheduled uplink data transmission.

Various embodiments of the present disclosure likewise include a user equipment configured with one or more circuits for performing the above methods.

Regardless, each embodiment of the present disclosure advantageously sends a scheduling request only when necessary. For example, many embodiments cancel the sending of a pending scheduling request when it has served its purpose. This is only guaranteed if the scheduling request is cancelled when the data that triggered it is accounted for in a buffer status, or the data that triggered it is included in a scheduled transmission. Thereby the performance in the wireless communications network improves by making sure no scheduling requests are sent unnecessarily and no scheduling requests are cancelled erroneously. Unnecessarily sent scheduling requests lead to increased interference and potentially to unnecessary grants for Uplink Shared Channel resources being sent by the base station, and erroneously cancelled scheduling requests can lead to the user equipment not being able to transmit data in its buffer.

BRIEF DESCRIPTION OF THE DRAWINGS

The present disclosure is described in more detail with reference to attached drawings illustrating exemplary embodiments in which.

DETAILED DESCRIPTION

Figure 1:
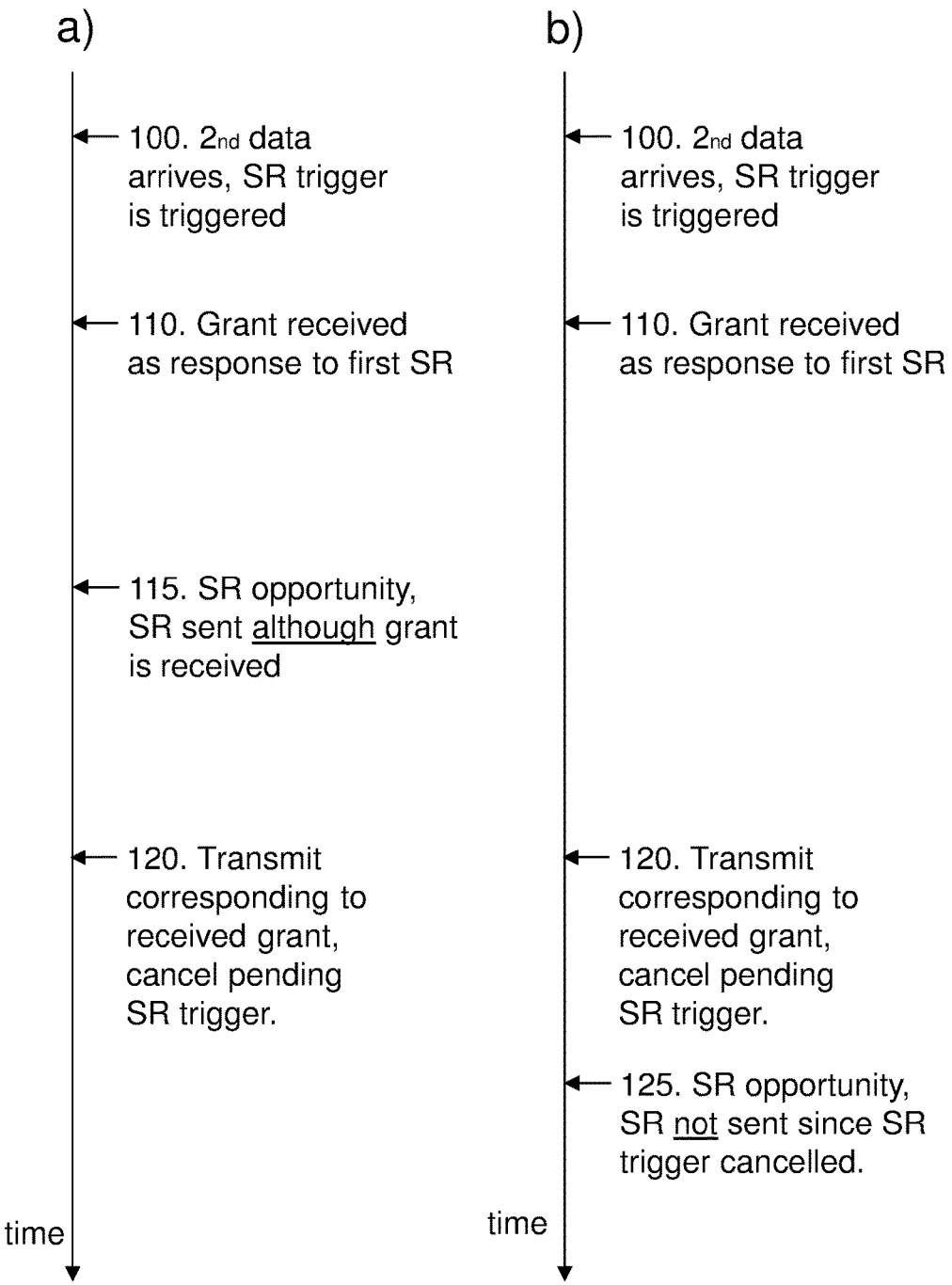
FIG. 1 is a schematic diagram illustrating an analysis of the problem addressed by various embodiments of the present disclosure.

As mentioned above, the latest version of the LTE standard specifies that all pending SRs shall be canceled in the TTI when UL-SCH resources are actually available for a new transmission. FIG. 1 illustrates an analysis of this alternative in the case that new, second data arrives to the user equipment buffer before a grant for the first data is received. That is, assume that first data has arrived to the user equipment buffer. This first data has triggered a buffer status report. This first data has also directly or indirectly triggered a first scheduling request trigger, for sending a scheduling request at the next scheduling request opportunity. The scheduling request opportunity has occurred and a first scheduling request has been transmitted to the base station. The first scheduling request trigger is still pending. It will be cancelled upon transmission of UL data; that is, in the TTI when UL-SCH resources are actually available for transmitting that UL data.

Looking at a time line, there are then two different cases that appear, case a) and case b) illustrated in FIG. 1. In case a), the user equipment has a scheduling request opportunity between receiving the UL grant and transmitting the data. In case b) the user equipment has no scheduling request opportunity between receiving the UL grant and transmitting the data; the next SR opportunity occurs after the transmission of the data.

For case a) assume the following steps:

Step 100. New second data arrives in the user equipment buffer. This second data triggers a buffer status report trigger. This second data, directly or indirectly via the buffer status report trigger, also triggers a second scheduling request trigger to send a scheduling request for the second data at the next opportunity.

Step 110. As a response to the first scheduling request sent to the base station, the user equipment receives from the base station, an UL grant for transmission.

Step 115. The first and second scheduling request triggers are pending, implying that the user equipment will send a scheduling request to the base station at the next scheduling request opportunity. At this point in time a scheduling request opportunity occurs, i.e., this scheduling request opportunity occurs between receiving the UL grant and transmitting the data according to case a). Therefore the user equipment again sends a scheduling request to the base station although a grant has already been received. This is unnecessary to send and is confusing for the base station to receive. This is a disadvantage.

Step 120. In this step the user equipment transmits to the base station. It cannot be known for sure if the user equipment transmission includes data from the first or second data since the grant is just a grant of resources and the user equipment makes the decision of which data to transmit. The second data may be of higher priority than the first data, in which case parts of second data will be sent. However, a buffer status report is also included in the transmission to the base station, unless all data can fit in the transmission but not a buffer status report. If included, the buffer status report accounts for whatever is left of the first data and also for the second data after the scheduled transmission has been made. Since the rule in this example is to cancel SR at transmission of UL data, the user equipment cancels both pending SR triggers at this point in time. However, the base station does not know how to interpret the second scheduling request 115. Based on the second scheduling request, it may send a new grant thinking there is more data that has not been accounted for in the transmission (120). If the buffer status report sent in the transmission (120) reflects empty buffers, such a new grant will only be filled by transmitting padding bits, meaning that both the grant and the padding transmission were unnecessary, taking resources that could have been used for other user equipments.

For case b) there are fewer problems. Assume the following steps:

Step 100. New second data arrives in the user equipment buffer. This second data triggers a buffer status report trigger. This second data, directly or indirectly via the buffer status report trigger, also triggers a second scheduling request trigger to send a scheduling request for the second data at the next opportunity.

Step 110. As a response to the first scheduling request sent to the base station, the user equipment receives from the base station, an UL grant for transmission.

Step 120. The user equipment transmits to the base station. Again, it cannot be known for sure if the user equipment transmission includes data from the first or second data. A buffer status report is included in the transmission to the base station, which buffer status report accounts for the first data and also for the second data since the second data arrived before the grant. Since the rule in this example is to cancel scheduling request at transmission of UL data, the user equipment cancels both pending scheduling request triggers at this point in time. This is good since no further scheduling requests need to be sent.

Step 125. A scheduling request opportunity occurs at this point in time, i.e. after the transmission of the data according to case b). The user equipment had no scheduling request opportunity between receiving the UL grant and transmitting the data as in case a). The scheduling request triggers are canceled and therefore not pending any more. This means that the user equipment will not again send a scheduling request to the base station at this next scheduling request opportunity. It is OK that the scheduling request was cancelled at the transmission. Since the second data arrived before the grant, it is assured that the second data is accounted for in the buffer status report or fully included in the transmission. That is good and safe.

In case a), the scheduling request trigger has not yet been cancelled when the scheduling request opportunity occurs. Hence, a new scheduling request is sent, although the user equipment has already received a grant in response to its previous scheduling request. There is no need for the second scheduling request in this case, but the user equipment is mandated by the specification to send it. This is a waste of user equipment energy and of radio resources, since the scheduling request creates unnecessary interference on the Physical Uplink Control Channel (PUCCH). Additionally, it is not clear what the base station should do in response to the unnecessary scheduling request. Note that the same procedure, with an extra unnecessary scheduling request and its unwanted consequences, would happen in case a) even if the user equipment received the first data but no second data.

However, there is an even more complicated case with worse problems in the following example related to FIGS. 2 and 3, where the user equipment gets new data to its buffer after a grant corresponding to the first scheduling request is received. This new data triggers a scheduling request trigger. Looking at a time line, there are then two different cases that appear, case a) illustrated in FIG. 2 and case b) illustrated in FIG. 3. In this example, as in the example in case a) relating to FIG. 1, the user equipment has a scheduling request opportunity between receiving the UL grant and transmitting the data. In case b) the user equipment has no scheduling request opportunity between receiving the UL grant and transmitting the data; the next scheduling request opportunity occurs after the transmission of the data.

In case a) and in case b) there are two respective alternatives, alternative I and alternative II. FIG. 2 depicts case a) alternative I and case a) alternative II, and FIG. 3 depicts case b) alternative I and case b) alternative II.

Figure 2:
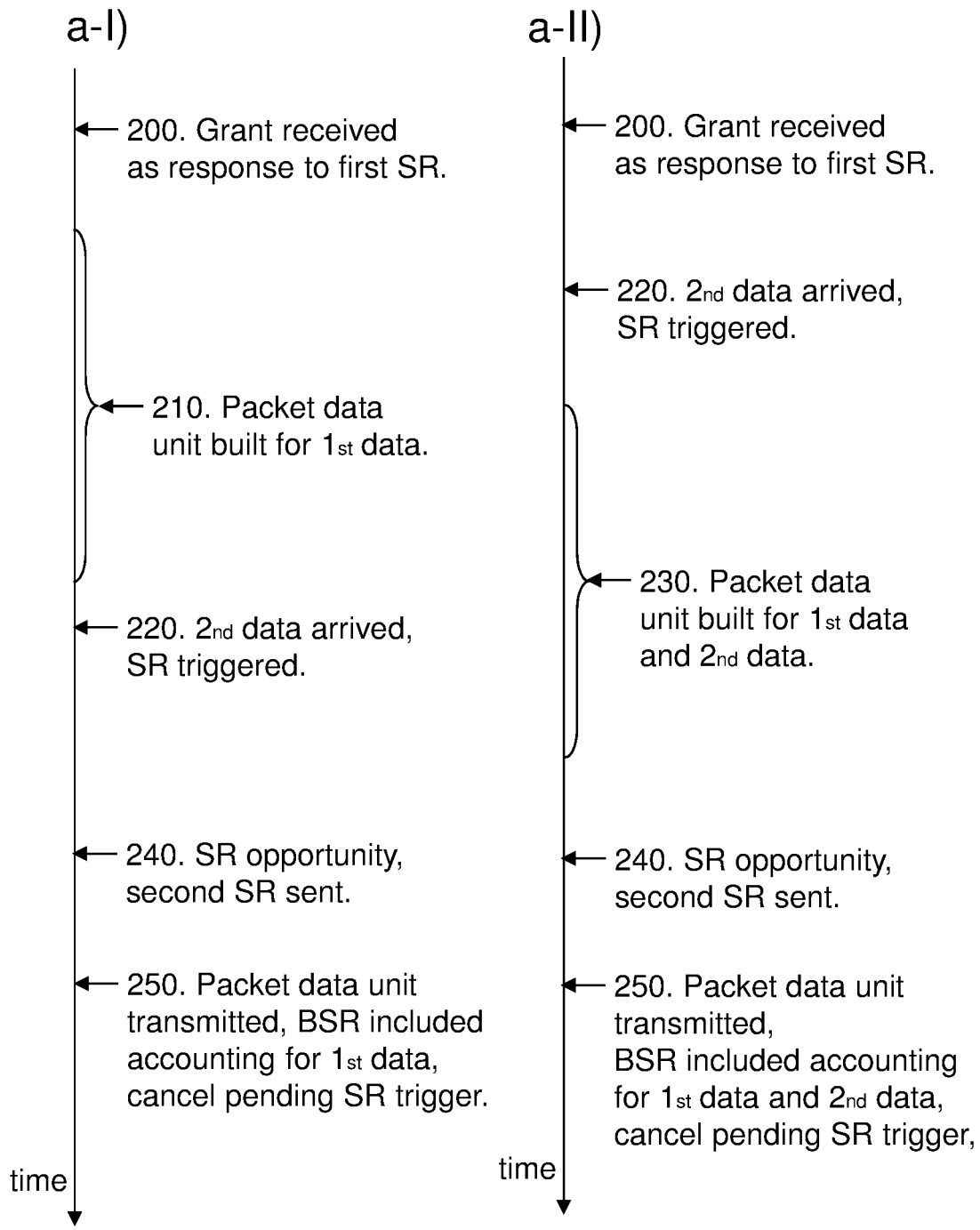
FIG. 2 is a schematic diagram illustrating an analysis of the problem addressed by various embodiments of the present disclosure.

Hence, FIG. 2 illustrates an analysis of the alternative to a cancel SR at transmission of UL data, when new data arrives between reception of grant and transmission of data corresponding to the grant for case a), wherein the user equipment has an SR opportunity between receiving the UL grant and transmitting the data. For example, assume that first data has arrived to the user equipment buffer. This first data has triggered a buffer status report trigger. This first data has also, directly or indirectly via the buffer status report trigger, triggered a first scheduling request trigger, for sending a scheduling request at the next scheduling request opportunity. The SR opportunity has occurred and the first scheduling request has been transmitted to the base station. The first scheduling request trigger has not yet been cancelled, however, is therefore still pending. It will be cancelled upon transmission of UL data.

For case a-I) assume the following steps:

Step 200 case a-I). As a response to the SR sent to the base station, the user equipment receives from the base station an UL grant for transmission.

Step 210 case a-I). During a time period the user equipment builds a packet data unit, such as a MAC PDU, for parts or all of the first data to be transmitted in, and includes a buffer status report in the packet data unit (unless all data can fit in but not a buffer status report). This packet data unit shall be sent to the base station at the transmission later on. The buffer status report accounts only for the first data.

Step 220 case a-I). New second data arrives in the user equipment buffer. This second data triggers a buffer status report. This second data further, directly or indirectly via the buffer status report trigger, triggers a second scheduling request trigger to send a scheduling request at the next opportunity. The second scheduling request trigger is pending in addition to the first scheduling request trigger, triggered by the first and the second data, respectively.

Step 240 case a-I). At this point in time a scheduling request opportunity occurs, i.e., this scheduling request opportunity occurs between receiving the UL grant and transmitting the data according to case a). Therefore the user equipment sends a second scheduling request to the base station, since the scheduling request has not yet been cancelled. This is necessary as the user equipment has already built the packet data unit including parts or all of the first data to be sent, before the second data became available in the user equipment buffer. The second data is thereby not accounted for in the buffer status report which will be sent at the transmission.

Step 250 case a-I). The user equipment transmits the packet data unit including the buffer status report, which buffer status report was triggered by the first data (mentioned above) and which buffer status report accounts for the first data but not the second data. Since the rule in this example is to cancel a scheduling request at transmission of UL data, the user equipment cancels both pending scheduling request triggers at this point in time. At this point, it is difficult for the base station to know how to interpret the second scheduling request sent; it does not know if the second scheduling request corresponds to second data, or if it corresponds to the first data, whose scheduling request trigger had not yet been cancelled. If the base station does not send a grant, it risks leaving the user equipment with data in its buffer, unable to transmit, and if it does send a new grant, it risks that this grant was unnecessary and the corresponding transmission will only be padding. Additionally, if the second scheduling request is not heard by the base station, e.g. because of excessive interference on PUCCH or PUCCH coverage problems, the scheduling request triggers are now cancelled and no new scheduling request will be sent even if no new grant is received for the second data. This means that the user equipment cannot get a grant from the base station to transmit its second data, which will remain in the user equipment since the base station does not know of its existence.

For case a-II) assume the following steps:

Step 200 case a-II). As a response to the first scheduling request sent to the base station, the user equipment receives from the base station, an UL grant for transmission.

Step 220 case a-II). New second data arrives in the user equipment buffer. This second data triggers a buffer status report trigger. This second data further, directly or indirectly via the buffer status report trigger, triggers a second scheduling request trigger, to send a scheduling request at the next opportunity. In case a-II), the second data arrives before building the packet data unit, whereas in case a-I the second data arrived after building the packet data unit.

Step 230 case a-II). During a time period the user equipment builds a packet data unit, such as a MAC PDU, for data to be transmitted in, which data is built in the packet data unit depending on the priority of the data in user equipment buffer. The user equipment includes a buffer status report in the packet data unit (unless all data can fit in but not a buffer status report). This packet data unit shall be sent to the base station at the transmission later on. The buffer status report accounts for both the first data and the second data.

Step 240 case a-II). The first and second scheduling request triggers are pending. At this point in time a scheduling request opportunity occurs, i.e., this scheduling request opportunity occurs between receiving the UL grant and transmitting the data according to case a). Therefore the user equipment again sends a scheduling request to the base station, since both scheduling request triggers are not yet cancelled. Just as in FIG. 1a, this is unnecessary, since both first and second data will be included in the buffer status report sent on already allocated resources.

Step 250 case a-II). The user equipment transmits data and the buffer status report in the built packet data unit, which buffer status report accounts for the first data and the second data. Since the rule in this example is to cancel scheduling request at transmission of UL data, the user equipment cancels both pending scheduling request triggers at this point in time.

In both case a-I and case a-II, an extra scheduling request is sent. Moreover, when receiving the extra scheduling request, the base station only knows that it has received two scheduling requests and therefore cannot distinguish between case a-I and case a-II, i.e. the base station cannot determine whether the same data was behind both scheduling requests, or if additional data was received for the second scheduling request. Correspondingly, the base station does not know if the buffer status report it received actually reflects the user equipment buffer sizes, as new data could have arrived after the buffer status report was built. The base station hence has to guess, and depending on its guess it risks either wasting a grant or losing track of the new data (since, because the new data has not been reported, the base station would have an inaccurate buffer size estimation).

Figure 3:
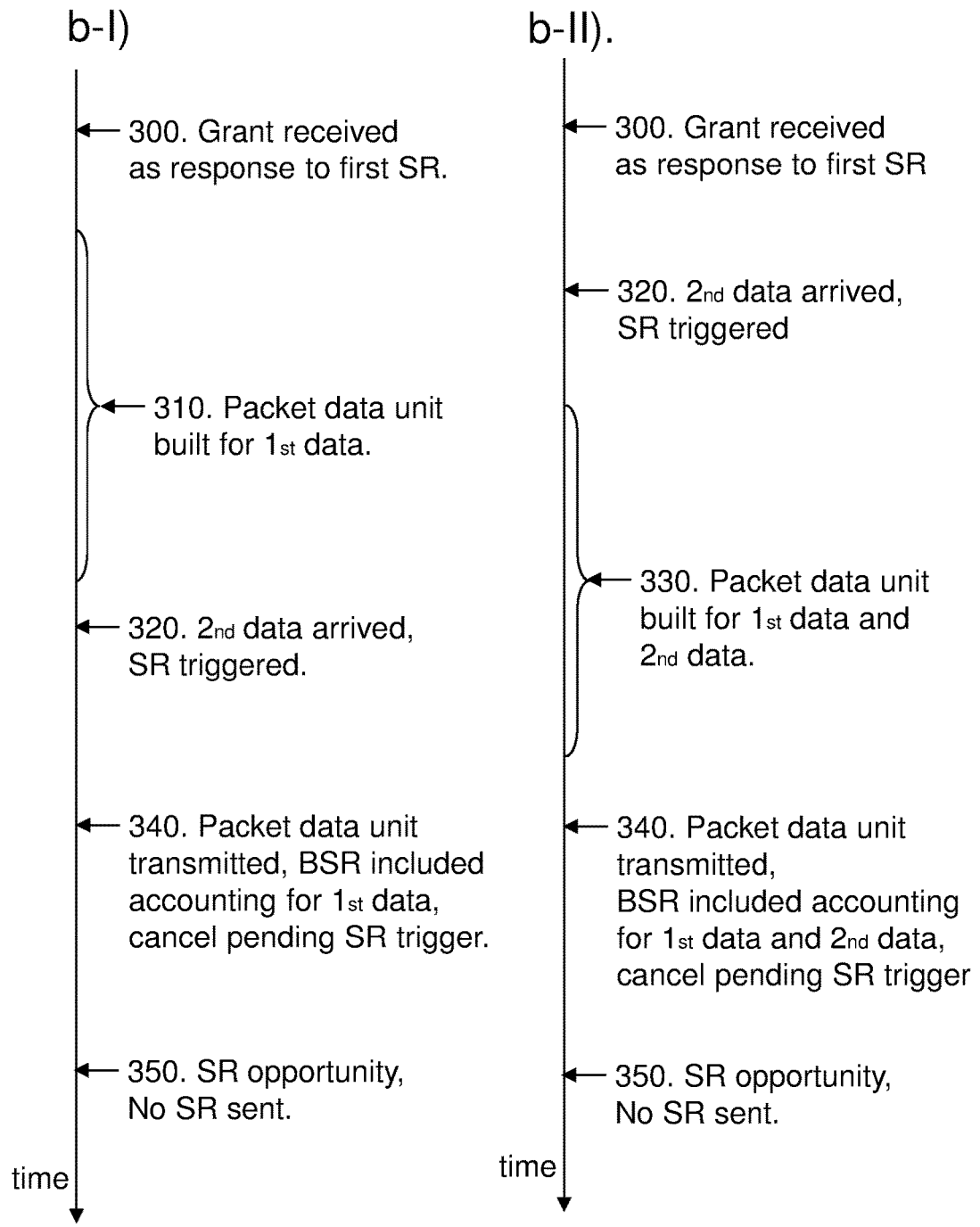
FIG. 3 is a schematic diagram illustrating an analysis of the problem addressed by various embodiments of the present disclosure.

FIG. 3 illustrates an analysis of the alternative to cancel a scheduling request at transmission of UL data, when new data arrives between reception of grant and transmission of data corresponding to the grant for case b), wherein the user equipment has no scheduling request opportunity between receiving the UL grant and transmitting the data; the next scheduling request opportunity occurs after the transmission of the data. Assume, for instance, that first data has arrived to the user equipment buffer. This first data has triggered a buffer status report trigger. This first data also, directly or indirectly via the buffer status report trigger, has triggered a first scheduling request trigger, for sending a scheduling request at the next scheduling request opportunity. The scheduling request opportunity has occurred and the first scheduling request has therefore been transmitted to the base station. The first scheduling request trigger has not yet been cancelled, and is therefore still pending. It will be cancelled upon transmission of UL data.

For case b-I) assume the following steps:

Step 300 case b-I). As a response to the scheduling request sent to the base station, the user equipment receives from the base station an UL grant for transmission.

Step 310 case b-I). During a time period the user equipment builds a packet data unit, such as a MAC PDU, for parts or all of the first data to be transmitted in, and includes a buffer status report in the packet data unit (unless all data can fit in but not a buffer status report). The packet data unit shall be sent to the base station at the transmission later on. The buffer status report accounts only for the first data.

Step 320 case b-I). New second data arrives in the user equipment buffer. This second data triggers a buffer status report. This second data further, directly or indirectly via the buffer status report trigger, triggers a second scheduling request trigger to send a scheduling request at the next opportunity.

Step 340 case b-I). The user equipment transmits the first data built in the packet data unit and includes the buffer status report in the packet data unit, which buffer status report was triggered by the first data and which buffer status report accounts for the first data but not the second data. Since the rule in this example is to cancel a scheduling request at transmission of UL data, the user equipment cancels both pending scheduling request triggers at this point in time. This means that there is no longer any pending scheduling request triggers to indicate that there is second data in the user buffer, even though no scheduling request for the second data has been transmitted to the base station yet, since no scheduling request opportunity has appeared at this point in time. In this case, the scheduling request needed for the second data will be lost!

Step 350 case b-I). At this point in time a scheduling request opportunity occurs i.e. after the transmission of the data according to case b). No scheduling request trigger is pending since it was cancelled in step 340. So as mentioned above, in this case, the SR for the second data will be lost. This is not good.

For case b-II) assume the following steps:

Step 300 case b-II). As a response to the scheduling request sent to the base station, the user equipment receives from the base station an UL grant for transmission.

Step 320 case b-II). New second data arrives in the user equipment buffer. This second data triggers a buffer status report trigger. This second data further, directly or indirectly, triggers a second scheduling request trigger, to send a scheduling request at the next opportunity. Thus in case b-II), the second data arrives before building the packet data unit, whereas in case b-I) the second data arrived after building the packet data unit.

Step 330 case b-II). During a time period the user equipment builds a packet data unit, such as a MAC PDU, for data to be transmitted in, which data is built in the packet data unit depending on the priority of the data in the user equipment buffer. The user equipment includes a buffer status report in the packet data unit (unless all data can fit in but not a buffer status report). This packet data unit shall be sent to the base station at the transmission later on. The buffer status report accounts for both the first data and the second data.

Step 340 case b-II). The user equipment transmits the data and the buffer status report in the packet data unit, which buffer status report accounts for the first data and the second data. Since the rule in this example is to cancel SR at transmission of UL data, the user equipment cancels the pending SR trigger at this point in time.

Step 350 case b-II). At this point in time, an SR opportunity occurs i.e. after the transmission of the data according to case b). No SR trigger is pending since it was cancelled in step 340. This is good in this case, since first and second data are already transmitted or accounted for in the BSR.

As can be seen, case b-II) works well but case b-I) does not. In both cases, the triggered second scheduling request trigger is never sent as it is cancelled when the first data is transmitted. However, if the second data is not included in the buffer status report sent as in case b-I), the base station will not know about this data. Two things may save the situation: (1) the user equipment receiving a grant for other data, not in response to the scheduling request never sent, since the transmission on that grant will include a buffer status report, or (2) a new SR being triggered by the arrival of yet new data.

Unless one of these occurs, the user equipment has no means of sending a new scheduling request until the fallback mechanism known as "retransmit buffer status report timer" or "retx-BSR-Timer" expires, triggering a scheduling request. However, this timer has a minimum value of 320 ms which adds considerable delay.

Therefore it is an object of the present disclosure to provide a mechanism in a user equipment that improves the performance in the wireless communications network.

Figure 4:
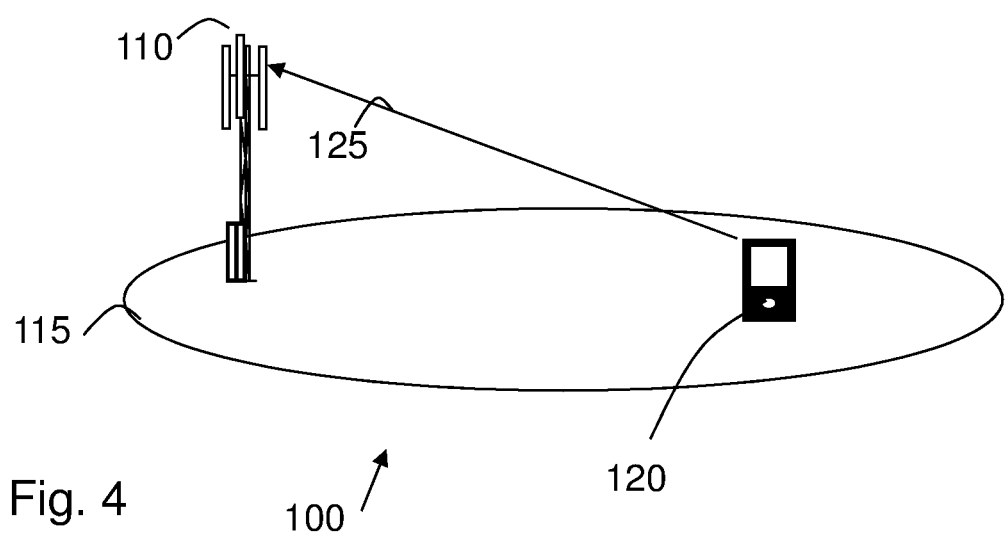
FIG. 4 is a schematic block diagram illustrating a wireless communication network according to one embodiment of the present disclosure.

Referring now to one embodiment of the present disclosure, FIG. 4 depicts a wireless communications system 100. The wireless communications system 100 is a packet-based communications system, which may be an LTE communications system, Worldwide Interoperability for Microwave Access (WMax) system, or any other wireless communications system handling scheduling requests for uplink scheduling.

The wireless communications system 100 comprises a base station 110 serving a cell 115. The base station 110 is a radio base station such as an eNB, a Radio Base Station (RBS) or any other network unit capable of communicating over a radio carrier with user equipments being present in the cell.

A user equipment 120 being present within the cell 115, is served by the base station 110, and is therefore capable of transmitting data packet units such as MAC PDUs to the base station 110 over a radio channel 125. The user equipment 120 may be a terminal, e.g. a mobile terminal or a wireless terminal, a mobile phone, a computer such as e.g. a laptop, Personal Digital Assistants (PDA), or any other radio network units capable to communicate with a base station over an air interface. The air interface may e.g. be an E-UTRA air interface used in LTE.

The user equipment 120 comprises a buffer, to which buffer new uplink data arrives that is to be transmitted to the base station 110. The data may be voice data, video data, photo data, text data or any other kind of data that a user may want to transmit. The arrival of new UL data of higher priority than the already existing data, or of any priority when there is no previous data, to the user equipment buffer triggers a buffer status report. The arrived new data further directly or indirectly triggers a scheduling request trigger to be pending. The indirectly triggering may be performed such that the arrived data triggers a buffer status report which in turn triggers the scheduling request trigger. The scheduling request trigger will trigger a scheduling request to be sent to the base station 110 at a next scheduling request opportunity. The "scheduling request trigger" may also be referred to as "a pending scheduling request". As mentioned above there is a fixed periodicity associated with the opportunities to transmit scheduling requests to the base station 110, so the user equipment 120 has to wait until such an opportunity is available. The base station 110 receiving the scheduling request is in that way informed that the user equipment 120 has new data that it would like to transmit. A scheduling request trigger is pending or not pending. A scheduling request is typically not associated with any specific arrived data and a scheduling request trigger does not need to be associated with any data, although it is implicitly associated with the data that triggered it. But if further data, here called second data, arrives to the user equipment buffer, thereby triggering a scheduling request trigger, a further scheduling request is triggered, even if a scheduling request trigger is already triggered.

As a response to a scheduling request, the base station 110 typically sends an uplink grant to the user equipment 120. The grant is specific to a user equipment, but is not associated with any specific arrived data in that user equipment. Priorities set by the eNB and signalled to the user equipment 120 decides which particular data shall be transmitted on the resources that the user equipment 120 has been allocated.

To make the handling of the scheduling procedure more reliable, which will improve the performance in the wireless communications network, a pending scheduling request trigger is cancelled in accordance with one embodiment as follows:

In a first embodiment, the pending scheduling request is cancelled when the data that triggered the scheduling request is accounted for in a buffer status report to be included in a scheduled data transmission to be transmitted to the base station 110, or when the data that triggered the scheduling request is included in a scheduled data transmission to be transmitted to the base station, whichever occurs first. In this latter case, the scheduled data need not be transmitted, just included in the packet data unit that a bit later will be transmitted.

Alternatively, in a second embodiment, the pending scheduling request is cancelled at any time by the user equipment, but the user equipment 120 keeps track of what data has been accounted for in the buffer status report to be included in a scheduled data transmission and what data has not been accounted for. In this case, when a next scheduling request opportunity appears, the user equipment 120 sends a scheduling request if and only if the buffer comprises data that has not yet been accounted for in a buffer status report. This is equivalent to having a pending scheduling request in the first embodiment, but does not necessarily have to be called "having a pending scheduling request". The consequence will however be the same: at the next scheduling request opportunity, the user equipment 120 will send a scheduling request if there is data not yet included in a buffer status report, and that data has not yet been sent.

A method in the user equipment 120 for handling a scheduling request trigger, according to some embodiments, will now be described with reference to the flowchart depicted in FIG. 5. As mentioned above, the user equipment 120 comprising a buffer.

The method comprises the following steps, which steps may as well be carried out in another suitable order than described below:

Step 501

The buffer in the user equipment 120 receives data to be transmitted to a base station 110.

Step 502

This step is optional, according to some embodiments, the user equipment 120 generates a buffer status report trigger. The buffer status report trigger is triggered by the arrived data.

Step 503

The user equipment 120 generates a scheduling request trigger, which scheduling request trigger is pending until it is cancelled, and which generation is triggered directly or indirectly by the arrived data. In some embodiments where this step is performed indirectly, the generation is triggered by the generation of the buffer status report trigger, which in turn was triggered by the arrived data.

Step 504

According to a first embodiment, the user equipment 120 cancels the pending scheduling request when the data that triggered the scheduling request is accounted for in a buffer status report to be included in a scheduled data transmission to be transmitted to the base station 110, or the user equipment 120 cancels the pending scheduling request when the data that triggered the scheduling request is included in a scheduled data transmission to be transmitted to the base station, whichever occurs first. The pending scheduling request trigger may hence be cancelled at the same time instance during which the MAC PDU including a buffer status report MAC control element is built.

When a packet data unit such as a MAC PDU is built, it includes a buffer status report such as a BSR MAC control element. The buffer status report accounts for data remaining in the user equipment buffer after the building of the packet data unit. Such a buffer status report is included if a buffer status report trigger is pending at the time that the MAC PDU is built, and all data cannot fit in the MAC PDU.

The user equipment 120 may cancel the pending scheduling request when the data that triggered the scheduling request is included in the buffer status report represented by a BSR MAC control element or when all data that triggered the scheduling request has been included in a MAC PDU for transmission. In the context of the LTE standards, such a method of operation can be understood as the user equipment 120 canceling a pending scheduling request when the buffer status report that triggered the scheduling request is canceled. Here, "when" does not necessarily connote a coincidence in time, and can be understood as the pending scheduling request being canceled upon cancellation of the pending buffer status report that triggered the pending scheduling request. In other words, in at least one embodiment, a pending scheduling request trigger is canceled, e.g. along with canceling the corresponding buffer status report trigger, if a currently scheduled data transmission will include all of the new data that caused the corresponding buffer status report trigger to be generated, or if a buffer status report to be included in the next currently scheduled data transmission—which may have been generated because of one or more other pending buffer status report triggers—will account for the new data.

Step 505

According to a second embodiment, as an alternative to step 504, the user equipment 120 cancels the pending scheduling request at any time, but the user equipment 120 keeps track of what data has been accounted for in the buffer status report to be included in a scheduled data transmission and what data has not been accounted for, and according to some embodiments, nor been included in a scheduled data transmission.

Step 506

According to the second embodiment, when a next scheduling request opportunity appears, the user equipment 120 sends a scheduling request if and only if the buffer comprises data that has not yet been accounted for in the buffer status report.

In this alternative embodiment, the user equipment 120 may internally cancel its pending scheduling request trigger whenever it wants, before or after the point in time in which the user equipment would have cancelled it according to the first embodiment in step 504, while still fulfilling the behaviour that can be tested by the 3GPP. This is, as mentioned above, performed by the user equipment 120 keeping track of data that has not yet been included in a buffer status report, and according to some embodiments, nor been included in a scheduled UL data transmission. This is equivalent to having a pending scheduling request in the first embodiment, but does not necessarily have to be called "having a pending scheduling request". The consequence will however be the same, at the next scheduling request opportunity, the user equipment 120 will send a scheduling request if there is data not yet included in a buffer status report, and that data has not yet been sent.

Further, in some embodiments as mentioned above, the buffer status report trigger may be generated in response to new data incoming to an uplink transmit buffer, and a scheduling request trigger may be generated corresponding to the buffer status report trigger. Thus, receiving new data into the uplink transmit buffer causes a new buffer status report trigger to be generated, which causes a new scheduling request trigger.

In one or more embodiments taught herein, advantageous handling and cancelling of pending buffer status report triggers and corresponding pending scheduling request triggers prevents uplink data from becoming stuck in the user equipment 120, and/or prevents or at least reduces unnecessary scheduling request transmissions and resultant unnecessary uplink resource grants.

Those skilled in the art will also appreciate that buffer status report triggers and corresponding scheduling request triggers may be implemented as flags or other logical indicators, which may be set or otherwise created to indicate the pending status, and cleared or otherwise deleted for cancellation.

Figure 5:
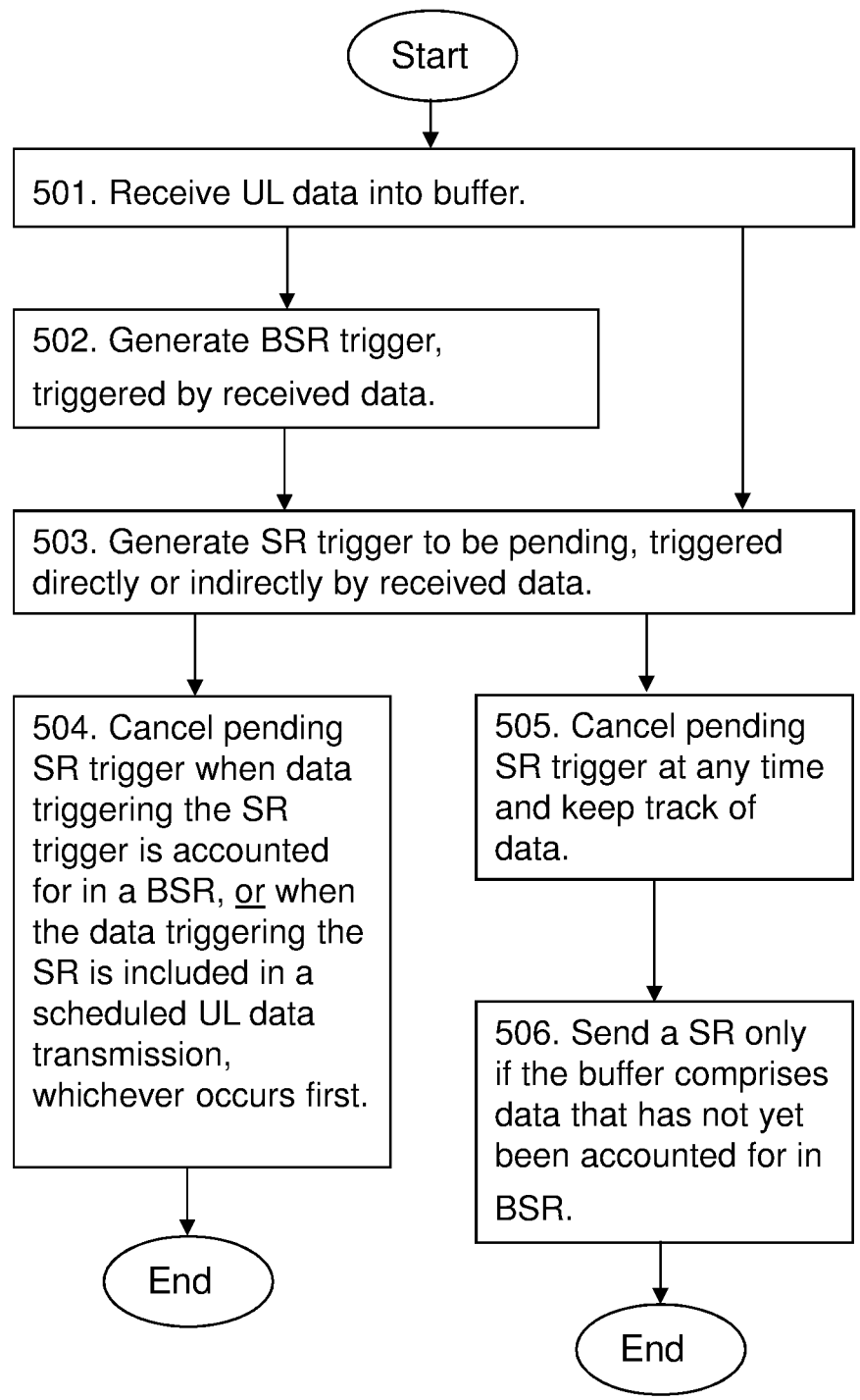
FIG. 5 is a flowchart depicting a method according to one embodiment of the present disclosure.
Figure 6:
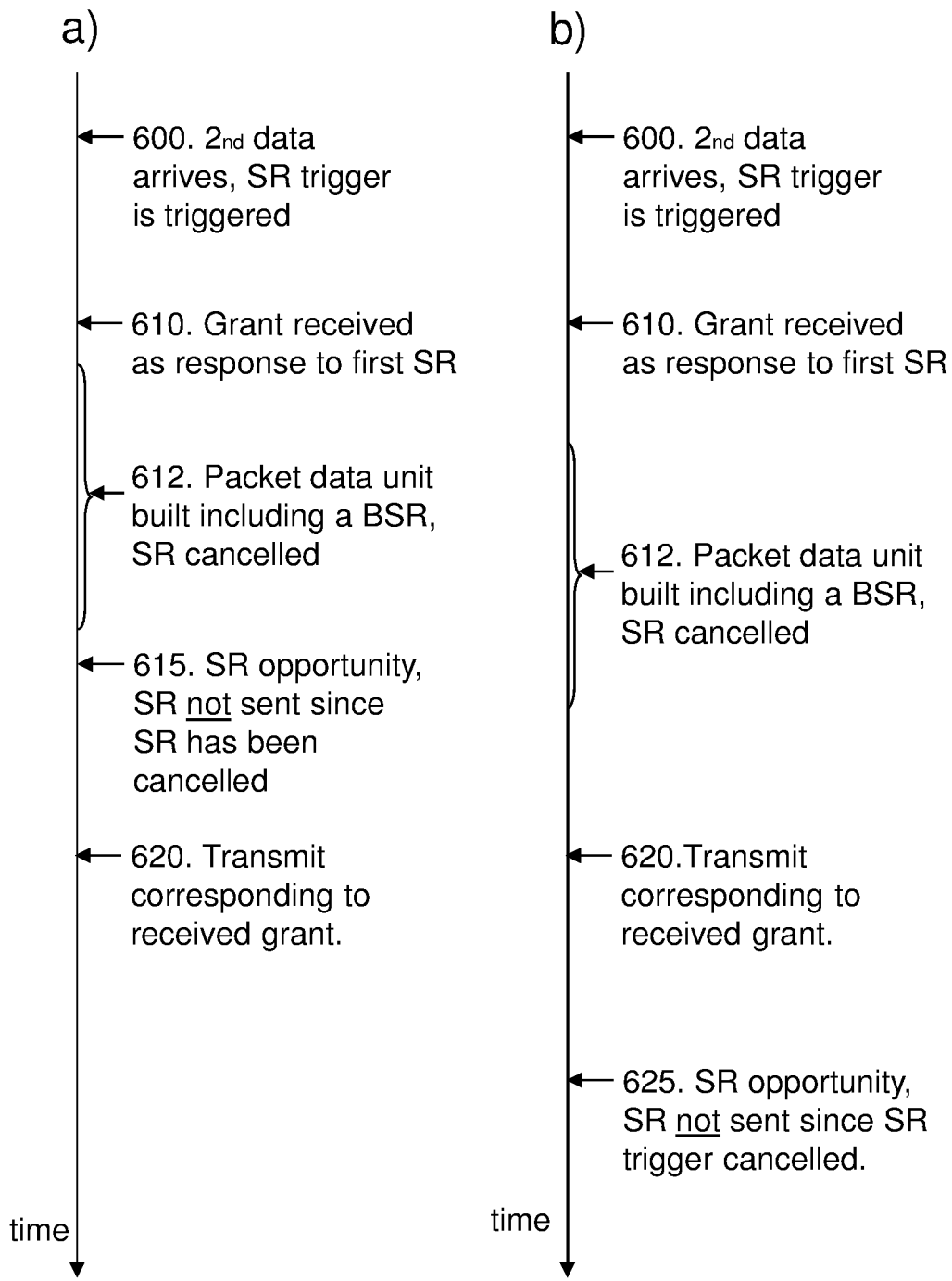
FIG. 6 is a schematic diagram illustrating an analysis of various embodiments of the present disclosure.

FIG. 6 illustrates an analysis according to the first embodiment, when new second data arrives to the user equipment buffer before a grant for the first data is received, i.e., the first embodiment comprises cancelling the scheduling request trigger when the data that triggered the scheduling request is accounted for in a buffer status report to be included in a scheduled data transmission to be transmitted to the base station 110, or cancelling the pending scheduling request when the data that triggered the scheduling request is included in a scheduled data transmission to be transmitted to the base station, whichever occurs first. Assume again that first data has arrived to the user equipment buffer, which corresponds to step 501 in FIG. 5. This first data has triggered a buffer status report, which corresponds to step 502 in FIG. 5. This first data has also directly or indirectly triggered a first scheduling request trigger, for sending a scheduling request at the next scheduling request opportunity, which corresponds to step 503 in FIG. 5. The scheduling request opportunity has occurred and the first scheduling request has been transmitted to the base station 110. The first scheduling request trigger is still pending. Looking at a time line, there are then two different cases that appears, case a) and b) illustrated in FIG. 6. In case a), the user equipment 120 has a scheduling request opportunity between receiving the UL grant and transmitting the data. In case b) the user equipment 120 has no scheduling request opportunity between receiving the UL grant and transmitting the data; the next scheduling request opportunity occurs after the transmission of the data.

For case a) assume the following steps:

Step 600. New second data arrives in the user equipment buffer. This second data triggers a buffer status report. This second data directly or indirectly via the buffer status report trigger, triggers a second scheduling request trigger to send a scheduling request at the next opportunity.

Step 610. As a response to the first scheduling request sent to the base station 110, the user equipment 120 receives an UL grant for transmission from the base station 110.

Step 612. During a time period the user equipment 120 builds a packet data unit, such as a MAC PDU, for parts or all of the first and second data to be transmitted in, and includes a buffer status report in the packet data unit (unless all data can fit in but not a buffer status report). The packet data unit shall be sent to the base station 110 at the transmission later on. According to this embodiment, all pending scheduling request triggers are canceled at this point in time, and also all pending buffer status report triggers.

Step 615. The first and second scheduling request triggers are not pending, implying that the user equipment 120 will not send a scheduling request to the base station 110 at the next scheduling request opportunity. Thus, at this point in time when a scheduling request opportunity occurs, no scheduling request is sent. This is good, since all data has been accounted for either in a buffer status report or in the scheduled transmission.

Step 620. The user equipment 120 transmits the built packet data unit to the base station 110.

For case b) assume the following steps:

Step 600. New second data arrives in the user equipment buffer. This second data triggers a buffer status report trigger. This second data directly or indirectly via the buffer status report triggers a scheduling request trigger to send a scheduling request at the next opportunity. This step is the same as for case a).

Step 610. As a response to the first scheduling request sent to the base station 110, the user equipment 120 receives from the base station, an UL grant for transmission. This step is also the same as for case a).

Step 612. During a time period the user equipment 120 builds a packet data unit, such as a MAC PDU, for parts or all of the first and second data to be transmitted in, and includes a buffer status report in the packet data unit (unless all data can fit in but not a buffer status report). The packet data unit shall be sent to the base station 110 at the transmission later on. According to this embodiment, all pending scheduling request triggers are canceled at this point in time, and also all pending buffer status report triggers.

Step 620. The user equipment 120 transmits the built packet data unit to the base station 110. Again, it cannot be known for sure if the user equipment 120 transmits according to first or second data. A buffer status report is included in the transmission to the base station 110, which buffer status report accounts for the first and also for the second data since the second data arrived before the grant. The rule in this example is to cancel the scheduling request trigger when the data that triggered the scheduling request is accounted for in a buffer status report to be included in a scheduled data transmission to be transmitted to the base station 110, or the user equipment 120 cancels the pending scheduling request when the data that triggered the scheduling request is included in a scheduled data transmission to be transmitted to the base station, whichever occurs first. Since this buffer status report and the data packet unit including first and second data was built before this point in time of sending, i.e. before step 620, the user equipment 120 has cancelled the pending scheduling request triggers. This is good, since there is no reason to send an additional scheduling request at the next scheduling request opportunity.

Step 625. A scheduling request opportunity occurs at this point in time, i.e. after the transmission of the data according to case b). The user equipment 120 had no scheduling request opportunity between receiving the UL grant and transmitting the data as in case a). The scheduling request trigger is already canceled and therefore not pending any more. This means that the user equipment 120 will not again send a scheduling request to the base station 110 at the next scheduling request opportunity. This is good.

Hence, no unnecessary scheduling request is sent in either case a) or case b) and, thus, there is no ambiguity in the user equipment 120 as to what a scheduling request means. In both cases a) and b), a scheduling request means that there is new data in the user equipment 120 that the user equipment 120 was not previously aware of. There is still an error case where the scheduling request opportunity 615 is before the packet unit build 612, in which case there will be an extra scheduling request sent and an ambiguity in the user equipment 120 as to what the SR means similar to the analysis of case a) in FIG. 1, but there is a much smaller probability of having an SR opportunity between arrival of second data and build of packet unit as in the possible error case in FIG.

6, than there is of having an SR opportunity between arrival of second data and transmission of data as in FIG. 1.

Figure 7:
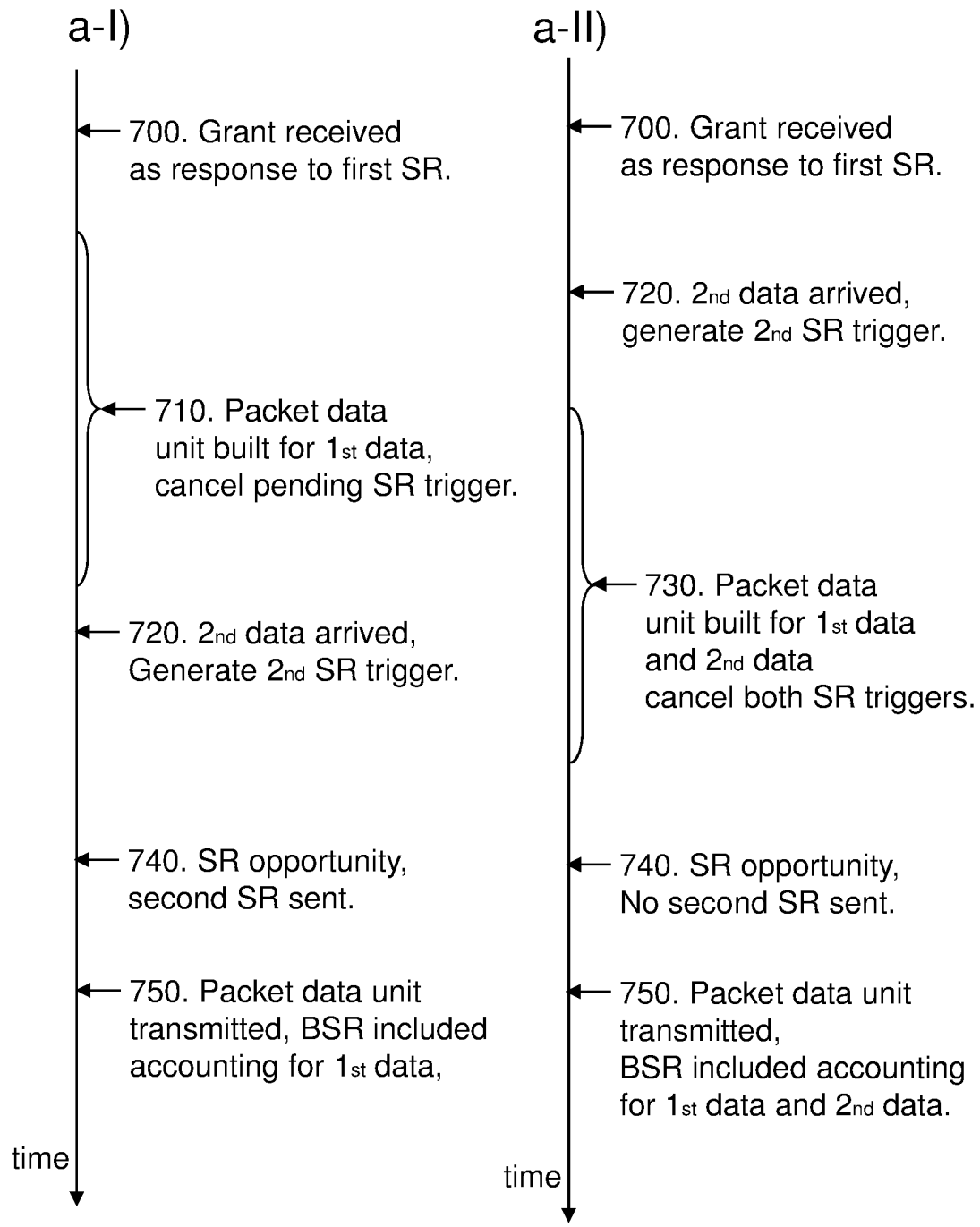
FIG. 7 is a schematic diagram illustrating an analysis of various embodiments of the present disclosure.
Figure 8:
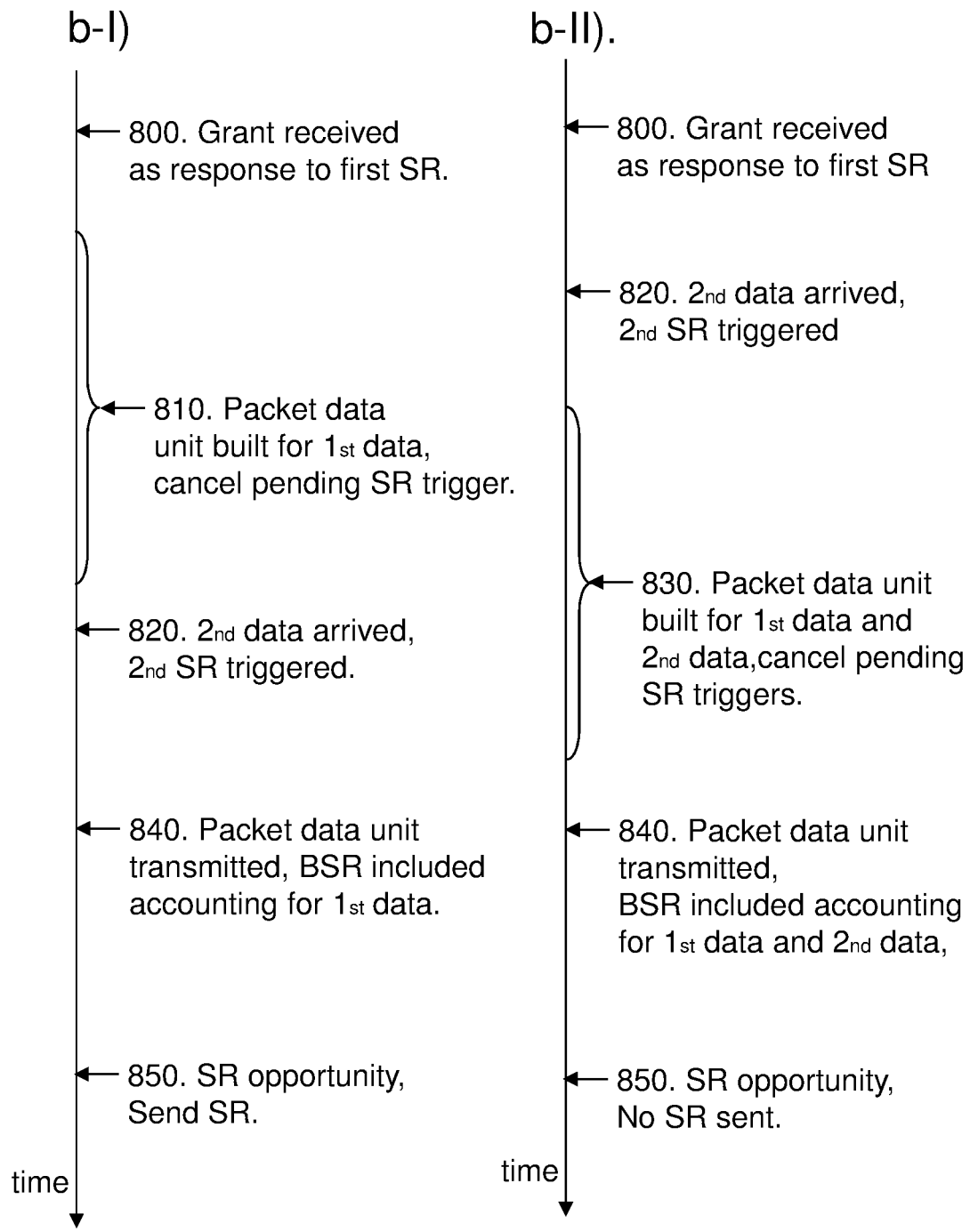
FIG. 8 is a schematic diagram illustrating an analysis of various embodiments of the present disclosure.

FIG. 7 and FIG. 8 illustrates an analysis according to the first embodiment, where the user equipment 120 gets new data to its buffer after a grant corresponding to the first scheduling request is received. This new data triggers a scheduling request trigger. Looking at a time line, there are then two different cases that appears, case a) illustrated in FIG. 7 and b) illustrated in FIG. 8. In case a), the user equipment 120 has a scheduling request opportunity between receiving the UL grant and transmitting the data. In case b) the user equipment 120 has no scheduling request opportunity between receiving the UL grant and transmitting the data, the next scheduling request opportunity comes after the transmission of the data.

In case a) and in case b) there are two respective alternatives, alternative I and alternative II. FIG. 7 depicts case a) alternative I and case a) alternative II, and FIG. 8 depicts case b) alternative I and case b) alternative II.

Hence FIG. 7 illustrates an analysis according to the present embodiment in the scenario when new data arrives between reception of grant and transmission of data corresponding to the grant for case a), wherein the user equipment 120 has a scheduling request opportunity between receiving the UL grant and transmitting the data. Assume that first data has arrived to the user equipment buffer, which corresponds to step 501 in FIG. 5. This first data has triggered a buffer status report, which corresponds to step 502 in FIG. 5. This first data also, directly or indirectly via the buffer status report trigger, has triggered a first scheduling request trigger for sending a scheduling request at the next scheduling request opportunity, which corresponds to step 503 in FIG. 5. The scheduling request opportunity has occurred and the first scheduling request has been transmitted to the base station. The first scheduling request trigger is still pending. According to this embodiment, the scheduling request trigger will be cancelled when the data that triggered the scheduling request is accounted for in a buffer status report to be included in a scheduled data transmission to be transmitted to the base station 110, or the user equipment 120 cancels the pending scheduling request when the data that triggered the scheduling request is included in a scheduled data transmission to be transmitted to the base station, whichever occurs first.

For case a-I) assume the following steps:

Step 700 case a-I) As a response to the scheduling request sent to the base station 110, the user equipment 120 receives from the base station an UL grant for transmission.

Step 710 case a-I). During a time period the user equipment 120 builds a packet data unit, such as a MAC PDU, for parts or all of the first data to be transmitted in, and includes a buffer status report in the packet data unit (unless all data can fit in but not a buffer status report). This packet data unit shall be sent to the user equipment 120 at the transmission later on. The buffer status report accounts for the first data. According to the first embodiment, the pending first scheduling request is cancelled at this point in time, which corresponds to step 504 in FIG. 5.

Step 720 case a-I). New second data arrives in the user equipment buffer. This second data triggers a buffer status report. This second data further, directly or indirectly, triggers a second scheduling request trigger, to send a scheduling request at the next opportunity. The second scheduling request trigger is pending, triggered by the second data.

Step 740 case a-I). At this point in time a scheduling request opportunity occurs, i.e. this scheduling request opportunity occurs between receiving the UL grant and transmitting the data according to case a). Therefore the user equipment 120 sends a second scheduling request to the base station 110, since the second scheduling request is pending. This is necessary as the user equipment 120 has already built the packet data unit including parts or all of the first data to be sent, before the second data became available in the user equipment buffer. The second data is thereby not accounted for in the buffer status report which will be sent to the base station 110 at the transmission.

Step 750 case a-I). The user equipment 120 transmits the packet data unit including the buffer status report, which buffer status report was triggered by the first data (mentioned above) and which buffer status report accounts for the first data but not the second data. At this point, it is not difficult any more for the base station 110 to know how to interpret the second scheduling request sent, it corresponds to new data not accounted for in the buffer status report received in the transmission. Additionally, it was necessary for the user equipment 120 to send the second scheduling request, since the base station 110 would not have known about the second data if the second scheduling request had not been sent.

For case a-II) assume the following steps:

Step 700 case a-II). As a response to the first scheduling request sent to the base station, the user equipment 120 receives from the base station 110 an UL grant for transmission.

Step 720 case a-II). New second data arrives in the user equipment buffer. This second data triggers a buffer status report. This second data further, directly or indirectly via the buffer status report, triggers a second scheduling request trigger to send a scheduling request at the next opportunity. In case a-II), the second data arrives before building the packet data unit, wherein in case a-I) the second data arrived after building the packet data unit.

Step 730 case a-II). During a time period the user equipment 120 builds a packet data unit, such as a MAC PDU, for data to be transmitted in, which data is built in the packet data unit depending on the priority of the data in the user equipment buffer. The user equipment includes a buffer status report in the packet data unit (unless all data can fit in but not a buffer status report). This packet data unit shall be sent to the base station at the transmission later on. The buffer status report accounts for the first and second data being built in the packed data unit. According to the first embodiment, the pending first and second scheduling requests are cancelled at this point in time, which corresponds to step 504 in FIG. 5.

Step 740 case a-II). At this point in time a scheduling request opportunity occurs, i.e. this scheduling request opportunity occurs between receiving the UL grant and transmitting the data according to case a). The scheduling request triggers are not pending any more. Therefore the user equipment 120 will not send any scheduling request to the base station 110. This is good because it would have been unnecessary to do so, since both first and second data will be accounted for in the buffer status report sent on already allocated resources.

Step 750 case a-II). The user equipment 120 transmits data and the buffer status report in the built packet data unit, which buffer status report accounts for the first data and the second data.

Hence, no unnecessary scheduling request is sent in either case a-I) or case a-II), and thus there is no ambiguity in the base station 110 as to what a scheduling request means. In both cases a-I) and a-II), a scheduling request means that there is new data in the user equipment 120 that the base station 110 was not previously aware of. The same error case as described for FIG. 6 is still present, but with a much smaller probability of happening with the present disclosure.

FIG. 8 illustrates an analysis according to one embodiment, in the scenario when new data arrives between reception of grant and transmission of data corresponding to the grant for case b) wherein the user equipment 120 has no scheduling request opportunity between receiving the UL grant and transmitting the data, the next scheduling request opportunity occurring after the transmission of the data. Assume that first data has arrived to the user equipment buffer, which corresponds to step 501 in FIG. 5. This first data has triggered a buffer status report, which corresponds to step 502 in FIG. 5. This first data also directly or indirectly via the buffer status report trigger, has triggered a first scheduling request trigger for sending a scheduling request at the next scheduling request opportunity, which corresponds to step 503 in FIG. 5. The scheduling request opportunity has occurred and a first scheduling request is transmitted to the base station. The first scheduling request trigger is still pending. According to one or more embodiments, the scheduling request trigger will be cancelled when the data that triggered the scheduling request is accounted for in a buffer status report to be included in a scheduled data transmission to be transmitted to the base station 110, or the user equipment 120 cancels the pending scheduling request when the data that triggered the scheduling request is included in a scheduled data transmission to be transmitted to the base station, whichever occurs first.

For case b-I) assume the following steps:

Step 800 case b-I). As a response to the scheduling request sent to the base station, the user equipment 120 receives from the base station an UL grant for transmission.

Step 810 case b-I). During a time period the user equipment 120 builds a packet data unit, such as a MAC PDU, for parts or all of the first data to be transmitted in, and includes a buffer status report in the packet data unit (unless all data can fit in but not a buffer status report). This packet data unit shall be sent to the user equipment 120 at the transmission later on. The buffer status report accounts for the first data. According to the first embodiment, the pending first scheduling request is cancelled at this point in time, which corresponds to step 504 in FIG. 5.

Step 820 case b-I). New second data arrives in the user equipment buffer. This second data triggers a buffer status report trigger. This second data further, directly or indirectly, triggers a second scheduling request trigger, to send a scheduling request at the next opportunity.

Step 840 case b-I). The user equipment 120 transmits the first data built in the packet data unit and includes the buffer status report in the packet data unit, which buffer status report was triggered by the first data (mentioned above) and which buffer status report accounts for the first data but not the second data.

Step 850 case b-I). At this point in time a scheduling request opportunity occurs i.e. after the transmission of the data according to case b). Since the second scheduling request trigger is pending at this point in time, the user equipment 120 sends a scheduling request to the base station 110 at this point in time. This is good, since no scheduling request for the second data has been transmitted to the user equipment 120 yet. Now, there is no risk for the scheduling request for the second data to be lost!

For case b-II) assume the following steps:

Step 800 case b-II). As a response to the scheduling request sent to the base station, the user equipment 120 receives from the base station an UL grant for transmission.

Step 820 case b-II). New second data arrives in the user equipment buffer. This second data triggers a buffer status report. This second data further, directly or indirectly via the buffer status report, triggers a second scheduling request trigger to send a scheduling request at the next opportunity. In case a-II), the second data arrives before building the packet data unit, whereas in case a-I the second data arrived after building the packet data unit.

Step 830 case b-II). During a time period the user equipment 120 builds a packet data unit, such as a MAC PDU, for data to be transmitted in, which data is built in the packet data unit depending on the priority of the data in user equipments' buffers. The user equipment includes a buffer status report in the packet data unit (unless all data can fit in but not a buffer status report). This packet data unit shall be sent to the base station at the transmission later on. The buffer status report accounts for the first and second data being built in the packed data unit. According to the first embodiment, the pending first and second scheduling requests are cancelled at this point in time, which corresponds to step 504 in FIG. 5.

Step 840 case b-II). The user equipment 120 transmits the data and the buffer status report in the packet data unit, which buffer status report accounts for the first data and the second data.

Step 850 case b-II). At this point in time a scheduling request opportunity occurs i.e. after the transmission of the data according to case b). No scheduling request trigger is pending since it was cancelled in step 830. This is good in this case since first and second data are already transmitted or accounted for in the BSR.

Figure 9:
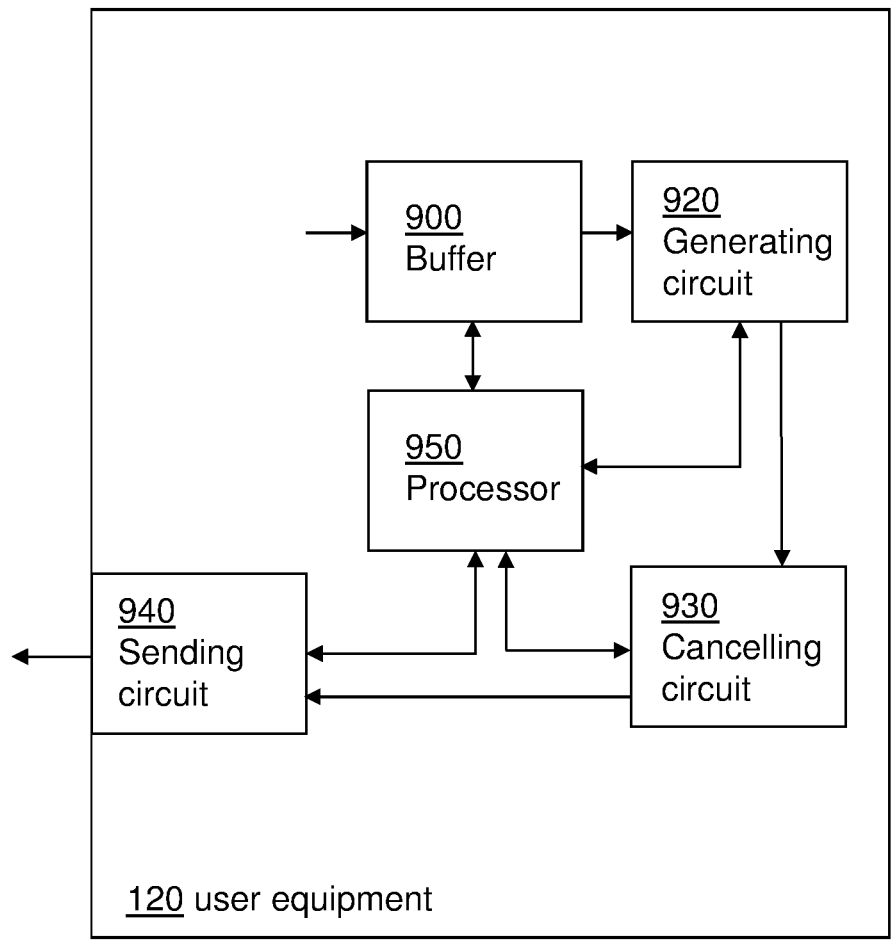
FIG. 9 is a schematic block diagram illustrating a user equipment according to one embodiment of the present disclosure.

To perform the method steps referred to in FIG. 5 above for handling a scheduling request trigger, the user equipment 120 in one embodiment is configured as depicted in FIG. 9.

As mentioned above, the user equipment 120 comprises a buffer 900 configured to receive data to be transmitted to the base station 110.

The user equipment 120 further comprises a generating circuit 920 configured to generate a scheduling request trigger, which scheduling request trigger is pending until it is cancelled, and which generation is triggered directly or indirectly by the arrived data.

The user equipment 120 further comprises a cancelling circuit 930.

According to a first embodiment, the cancelling circuit 930 is configured to cancel the pending scheduling request trigger when the data that triggered the generation of the scheduling request trigger is accounted for in a buffer status report to be included in a scheduled data transmission to be transmitted to the base station 110, or when the data that triggered the generation of the scheduling request is included in a scheduled data transmission to be transmitted to the base station 110, whichever occurs first.

According to a second embodiment, the cancelling circuit 930 is configured to cancel the pending scheduling request trigger at any time, but keeps track of what data that has either been accounted for in the buffer status report to be included in a scheduled data transmission or included directly in the scheduled data transmission and what data that has not been accounted for in any of these two ways.

According to a combined first and second embodiment, the cancelling circuit 930 is configured to cancel the pending scheduling request trigger when the data that triggered the generation of the scheduling request trigger is accounted for in a buffer status report to be included in a scheduled data transmission to be transmitted to the base station 110, or when the data that triggered the generation of the scheduling request is included in a scheduled data transmission to be transmitted to the base station 110, whichever occurs first, or alternatively to cancel the pending scheduling request trigger at any time, but keeping track of what data that has been accounted for in the buffer status report to be included in a scheduled data transmission and what data that has not been accounted for.

According the second embodiment and the combined first and second embodiment, the user equipment 120 comprises a sending circuit 940 configured to, when a next scheduling request opportunity appears, send a scheduling request if and only if the buffer comprises data that has not yet been accounted for in any of the two ways mentioned.

According the combined first and second embodiment the sending circuit 940 is configured to, when a next scheduling request opportunity appears, send a scheduling request if and only if the buffer comprises data that has not yet been accounted for in the buffer status report.

The present mechanism for handling a scheduling request trigger may be implemented through one or more processors, such as a processor 950 in the user equipment 120 depicted in FIG. 9, together with computer program code for performing the functions of the present disclosure. The program code mentioned above may also be provided as a computer program product, for instance in the form of a data carrier carrying computer program code for performing the present disclosure when being loaded into the user equipment 120. One such carrier may be in the form of a CD ROM disc. It is however feasible with other data carriers such as a memory stick. The computer program code may furthermore be provided as pure program code on a server and downloaded to the user equipment 120.

Figure 10:
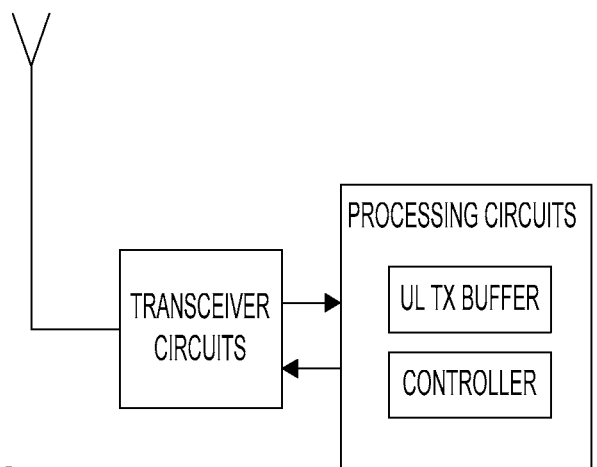
FIG. 10 is a schematic block diagram illustrating a user equipment according to one embodiment of the present disclosure.

FIG. 10 depicts one embodiment of the user equipment 120, including processing circuits operatively associated with transceiver circuits (radiofrequency receiver front-end, transmit modulator/amplifier, etc.), and one or more transmit/receive antennas.

The user equipment 120 is, for example, a mobile terminal or other type of user equipment configured for operation in a wireless communication system based on the LTE standards.

In any case, the user equipment 120 is configured to implement any of the embodiments described herein. For example, the processing circuits may comprise one or more baseband processors. In at least one embodiment, the processing circuits comprise one or more microprocessor-based circuits, such as a Digital Signal Processor (DSP) or other digital processor. Further, those skilled in the art will appreciate that the user equipment 120 includes one or more memory circuits—e.g., non-volatile and volatile—for storing program instructions, configuration and provisioning data, working data, etc.

In particular, the processing circuits within the user equipment 120 include an uplink transmit buffer such as the buffer 900—which may be a reserved portion of working memory—for buffering data for uplink transmission, and an associated controller for implementing all or part of the control and processing described herein and as referred to in the text above related to FIG. 9. That is, one or more embodiments of the controller such as the cancelling circuit 930, are configured to cancel a pending scheduling request when the data that triggered the scheduling request is included in a buffer status report MAC control element or the data that triggered the scheduling request is transmitted, whichever occurs first as described above. In an LTE context, the user equipment 120 can be understood as being configured to cancel a pending scheduling request when the buffer status report that triggered the scheduling request is canceled.

Alternatively, the user equipment's controller can be configured via hardware, software, or some combination thereof, to track what data has been included or otherwise accounted for in a buffer status report and what data has not. Accordingly, when a scheduling request opportunity comes, the user equipment 120 sends a scheduling request if it has data that has not yet been accounted for in a buffer status report (the buffer status report does not have to have been sent; for example, it is sufficient if the buffer status report is included in a MAC PDU that has been assembled for transmission.)

Both embodiments 1 and 2 lead to the same behavior, the advantage of which is that it is natural to cancel a pending SR when it has served its purpose. This is only guaranteed if the pending SR is cancelled when the data that triggered it is already accounted for in a buffer status report, or the data that triggered it is transmitted. Any other solution will lead to ambiguities or unnecessary SRs sent and/or unnecessary grants.

According to some embodiments, the present disclosure may be referred to as follows. When a scheduling request is triggered, it shall be considered as pending until it is cancelled. All pending scheduling requests shall be cancelled when a MAC PDU is assembled and this PDU includes a buffer status report which contains buffer status up to (and including) the last event that triggered a buffer status report, or when the uplink grant can accommodate all pending data available for transmission.

When using the word "comprise" or "comprising" it shall be interpreted as non-limiting, i.e. meaning "consist at least of". The word "built" is equal to the word "assembled" in this text.

The present disclosure is not limited to the above described preferred embodiments. Various alternatives, modifications and equivalents may be used. Therefore, the above embodiments should not be taken as limiting the scope of the present disclosure, which is defined by the claims and their legal equivalents.

The invention claimed is:

1. A method in a user equipment for handling a scheduling request, the method comprising:
   triggering a scheduling request in response to receiving new data to be transmitted to a base station, which scheduling request will remain pending until it is cancelled; and
   cancelling the pending scheduling request when pending uplink data is accounted for in any one of the following two ways:
      a Medium Access Control (MAC) Packet Data Unit (PDU) is to be transmitted to the base station, said PDU including a buffer status report which contains buffer status up to and including the last event that triggered a buffer status report; and
      an uplink grant has been received which can accommodate all the pending uplink data available for transmission.

2. The method of claim 1, wherein triggering the scheduling request in response to receiving the new data comprises generating a buffer status report trigger which in turn triggers the scheduling request.

3. The method of claim 2, wherein canceling the pending scheduling request comprises canceling the buffer status report trigger, which in turn triggers the canceling of the pending scheduling request.

4. The method of claim 1, further comprising:
sending the scheduling request to a base station during a next scheduling request opportunity if the pending scheduling request is still pending during the scheduling request opportunity.

5. A user equipment configured to handle a scheduling request, said user equipment comprising:
an antenna configured to send and receive wireless signals;
radio front-end circuitry connected to the antenna and to processing circuitry, and configured to condition signals communicated between the antenna and the processing circuitry, wherein the processing circuitry is configured to:
trigger a scheduling request in response to receiving new data to be transmitted to a base station, which scheduling request will remain pending until it is cancelled;
cancel the pending scheduling request when pending uplink data is accounted for in any one of the following two ways:
a Medium Access Control (MAC) Packet Data Unit (PDU) is to be transmitted to the base station, said PDU including a buffer status report which contains buffer status up to and including the last event that triggered a buffer status report;
an uplink grant has been received which can accommodate all the pending uplink data available for transmission.

6. The user equipment of claim 5, wherein the processing circuitry is further configured to trigger the scheduling request in response to receiving the new data by generating a buffer status report trigger, which in turn triggers the scheduling request.

7. The user equipment of claim 6, wherein the processing circuitry is further configured to cancel the pending scheduling request by cancelling the buffer status report trigger, which in turn triggers the canceling of the pending scheduling request.

8. The user equipment of claim 5, the processing circuitry being further configured to:
send the scheduling request to a base station during a next scheduling request opportunity if the pending scheduling request is still pending during the scheduling request opportunity.

* * * * *

UNITED STATES PATENT AND TRADEMARK OFFICE
CERTIFICATE OF CORRECTION

PATENT NO. : 10,375,721 B2
APPLICATION NO. : 15/834952
DATED : August 6, 2019
INVENTOR(S) : Östergaard et al.

Page 1 of 1

It is certified that error appears in the above-identified patent and that said Letters Patent is hereby corrected as shown below:

On the Title Page

On Page 2, in Item (56), under "OTHER PUBLICATIONS", in Column 2, Line 5, delete "Sevilla, Spain," and insert -- Seville, Spain, --, therefor.

In the Drawings

In Fig. 2, Sheet 2 of 9, under "a-II)", in Step "250", in Line 5, delete "trigger," and insert -- trigger. --, therefor.

In Fig. 8, Sheet 8 of 9, under "b-II)", in Step "840", in Line 4, delete "data," and insert -- data. --, therefor.

In the Specification

In Column 1, Line 9, delete "9,307,533" and insert -- 9,307,553, --, therefor.

In Column 1, Line 64, delete "entity" and insert -- entity. --, therefor.

In Column 3, Line 17, delete "transmission" and insert -- transmission. --, therefor.

In Column 10, Line 4, delete "(WMax)" and insert -- (WiMax) --, therefor.

In Column 15, Line 46, delete "a-I)" and insert -- a-I). --, therefor.

Signed and Sealed this
Eighteenth Day of February, 2020

Andrei Iancu
*Director of the United States Patent and Trademark Office*